United States Patent
Gass et al.

(10) Patent No.: US 7,100,483 B2
(45) Date of Patent: Sep. 5, 2006

(54) FIRING SUBSYSTEM FOR USE IN A FAST-ACTING SAFETY SYSTEM

(75) Inventors: Stephen F. Gass, Wilsonville, OR (US); Andrew L. Johnston, Redwood City, CA (US); Joel F. Jensen, Redwood City, CA (US); Sung H. Kim, Palo Alto, CA (US); David A. Fanning, Vancouver, WA (US); Robert L. Chamberlain, Raleigh, NC (US)

(73) Assignee: SD3, LLC, Wilsonville, OR (US)

( * ) Notice: Subject to any disclaimer, the term of this patent is extended or adjusted under 35 U.S.C. 154(b) by 527 days.

(21) Appl. No.: 09/929,240

(22) Filed: Aug. 13, 2001

(65) Prior Publication Data

US 2002/0020263 A1      Feb. 21, 2002

Related U.S. Application Data

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00*      (2006.01)

(52) U.S. Cl. .................... 83/58; 83/DIG. 1; 83/522.12; 192/129 R

(58) Field of Classification Search ............ 83/DIG. 1, 83/62.1, 62, 72, 58, 76.7, 788, 581, 471.2, 83/477.1, 477.2, 522.12, 526, 397.1, 522.121; 144/154.5, 356, 384, 391, 427, 286.5; 29/708, 29/254, 413; 324/550, 424; 408/5; 56/10.9, 56/11.3; 192/192 A, 129 R, 130; 102/202.7; 89/1.56; 137/68.12, 72, 76; 188/5, 6; 169/57, 169/59, 42, DIG. 3; 74/2; 403/2, 28; 411/2, 411/39, 390; 335/242, 1, 132; 318/362; 241/32.5; 337/239, 148, 1, 5, 10, 17, 140, 337/170, 190, 237, 401, 290, 404, 405; 218/2, 218/154; 307/639, 328, 115, 326, 142, 117, 307/126, 131; 451/409; 280/806; 297/480
See application file for complete search history.

(56) References Cited

U.S. PATENT DOCUMENTS 0,146,886 A    1/1874   Doane et al.

(Continued)

FOREIGN PATENT DOCUMENTS

CH         297525        6/1954

OTHER PUBLICATIONS

Gordon Engineering Corp., Product Catalog, Oct. 1997, pp. cover, 1, 3 and back, Brookfield, Connecticut, US.

*Primary Examiner*—Timothy V. Eley
*Assistant Examiner*—Jason Prone

(57) ABSTRACT

Cutting machines with high-speed safety systems, and firing subsystems used in high-speed safety systems, are disclosed. The cutting machines may include a detection system adapted to detect a dangerous condition between a cutting tool and a person. A reaction system performs a specified action, such as stopping the cutting tool, upon detection of the dangerous condition. A fusible member or explosive may be used to trigger the reaction system to perform the specified action. A firing subsystem may be used to fuse the fusible member or fire the explosive upon detection of the dangerous condition.

18 Claims, 8 Drawing Sheets

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlmann et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,883,486 A | 4/1959 | Mason |
| 2,894,546 A | 7/1959 | Eschenburg |
| 2,913,025 A | 11/1959 | Richards |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |

| | | | | | |
|---|---|---|---|---|---|
| 3,184,001 A | 5/1965 | Reinsch et al. | 4,117,752 A | 10/1978 | Yoneda |
| 3,186,256 A | 6/1965 | Reznick | 4,145,940 A | 3/1979 | Woloveke et al. |
| 3,207,273 A | 9/1965 | Jurin | 4,152,833 A | 5/1979 | Phillips |
| 3,224,474 A | 12/1965 | Bloom | 4,161,649 A | 7/1979 | Klos et al. |
| 3,232,326 A | 2/1966 | Speer et al. | 4,175,452 A | 11/1979 | Idel |
| 3,246,205 A | 4/1966 | Miller | 4,190,000 A | 2/1980 | Shaull et al. |
| 3,249,134 A | 5/1966 | Vogl et al. | 4,195,722 A | 4/1980 | Anderson et al. |
| 3,306,149 A | 2/1967 | John | 4,199,930 A | 4/1980 | Lebet et al. |
| 3,313,185 A | 4/1967 | Drake et al. | 4,249,117 A | 2/1981 | Leukhardt et al. |
| 3,315,715 A | 4/1967 | Mytinger | 4,249,442 A | 2/1981 | Fittery |
| 3,323,814 A | 6/1967 | Phillips | 4,262,278 A | 4/1981 | Howard et al. |
| 3,337,008 A | 8/1967 | Trachte | 4,267,914 A | 5/1981 | Saar |
| 3,356,111 A | 12/1967 | Mitchell | 4,270,427 A | 6/1981 | Colberg et al. |
| 3,386,322 A | 6/1968 | Stone et al. | 4,276,799 A | 7/1981 | Muehling |
| 3,439,183 A | 4/1969 | Hurst, Jr. | 4,291,794 A | 9/1981 | Bauer |
| 3,454,286 A | 7/1969 | Anderson et al. | 4,305,442 A | 12/1981 | Currie |
| 3,538,964 A | 11/1970 | Warrick et al. | 4,321,841 A | 3/1982 | Felix |
| 3,540,338 A | 11/1970 | McEwan et al. | 4,372,202 A | 2/1983 | Cameron |
| 3,554,067 A | 1/1971 | Scutella | 4,391,358 A | 7/1983 | Haeger |
| 3,566,996 A | 3/1971 | Crossman | 4,418,597 A | 12/1983 | Krusemark et al. |
| 3,580,376 A | 5/1971 | Loshbough | 4,466,233 A | 8/1984 | Thesman |
| 3,581,784 A | 6/1971 | Warrick | 4,470,046 A | 9/1984 | Betsill |
| 3,613,748 A | 10/1971 | De Pue | 4,510,489 A | 4/1985 | Anderson, III et al. |
| 3,670,788 A | 6/1972 | Pollack et al. | 4,512,224 A | 4/1985 | Terauchi |
| 3,675,444 A | 7/1972 | Whipple | 4,518,043 A | 5/1985 | Anderson et al. |
| 3,680,609 A | 8/1972 | Menge | 4,532,501 A | 7/1985 | Hoffman |
| 3,688,815 A | 9/1972 | Ridenour | 4,532,844 A | 8/1985 | Chang et al. |
| 3,695,116 A | 10/1972 | Baur | 4,557,168 A | 12/1985 | Tokiwa |
| 3,696,844 A | 10/1972 | Bernatschek | 4,560,033 A | 12/1985 | DeWoody et al. |
| 3,745,546 A * | 7/1973 | Struger et al. ............... 340/638 | 4,566,512 A | 1/1986 | Wilson |
| 3,749,933 A * | 7/1973 | Davidson .................... 307/116 | 4,573,556 A | 3/1986 | Andreasson |
| 3,754,493 A | 8/1973 | Niehaus et al. | 4,576,073 A | 3/1986 | Stinson |
| 3,772,590 A * | 11/1973 | Mikulecky et al. ......... 324/424 | 4,589,047 A * | 5/1986 | Gaus et al. .................... 361/42 |
| 3,785,230 A | 1/1974 | Lokey | 4,589,860 A | 5/1986 | Brandenstein et al. |
| 3,805,639 A | 4/1974 | Peter | 4,599,597 A | 7/1986 | Rotbart |
| 3,805,658 A | 4/1974 | Scott et al. | 4,599,927 A | 7/1986 | Eccardt et al. |
| 3,808,932 A | 5/1974 | Russell | 4,606,251 A | 8/1986 | Boileau |
| 3,829,850 A | 8/1974 | Guetersloh | 4,615,247 A | 10/1986 | Berkeley |
| 3,858,095 A | 12/1974 | Friemann et al. | 4,621,300 A | 11/1986 | Summerer |
| 3,861,016 A | 1/1975 | Johnson et al. | 4,625,604 A | 12/1986 | Handler et al. |
| 3,863,208 A | 1/1975 | Balban | 4,637,188 A | 1/1987 | Crothers |
| 3,880,032 A | 4/1975 | Green | 4,637,289 A | 1/1987 | Ramsden |
| 3,882,744 A | 5/1975 | McCarroll | 4,644,832 A | 2/1987 | Smith |
| 3,886,413 A | 5/1975 | Dow et al. | 4,653,189 A | 3/1987 | Andreasson |
| 3,889,567 A | 6/1975 | Sato et al. | 4,657,428 A | 4/1987 | Wiley |
| 3,922,785 A | 12/1975 | Fushiya | 4,672,500 A | 6/1987 | Roger et al. |
| 3,924,688 A * | 12/1975 | Cooper et al. ................. 169/61 | 4,679,719 A | 7/1987 | Kramer |
| 3,931,727 A | 1/1976 | Luenser | 4,722,021 A | 1/1988 | Hornung et al. |
| 3,935,777 A | 2/1976 | Bassett | 4,751,603 A | 6/1988 | Kwan |
| 3,945,286 A | 3/1976 | Smith | 4,756,220 A | 7/1988 | Olsen et al. |
| 3,946,631 A | 3/1976 | Malm | 4,757,881 A | 7/1988 | Jonsson et al. |
| 3,947,734 A | 3/1976 | Fyler | 4,792,965 A | 12/1988 | Morgan |
| 3,949,636 A | 4/1976 | Ball et al. | 4,805,504 A | 2/1989 | Fushiya et al. |
| 3,953,770 A | 4/1976 | Hayashi | 4,840,135 A | 6/1989 | Yamauchi |
| 3,967,161 A | 6/1976 | Lichtblau | 4,864,455 A * | 9/1989 | Shimomura et al. ........ 361/125 |
| 3,974,565 A | 8/1976 | Ellis | 4,875,398 A | 10/1989 | Taylor et al. |
| 3,975,600 A | 8/1976 | Marston | 4,896,607 A * | 1/1990 | Hall et al. .................. 102/247 |
| 3,994,192 A | 11/1976 | Faig | 4,906,962 A | 3/1990 | Duimstra |
| 4,007,679 A | 2/1977 | Edwards | 4,934,233 A | 6/1990 | Brundage et al. |
| 4,016,490 A | 4/1977 | Weckenmann et al. | 4,936,876 A | 6/1990 | Reyes |
| 4,026,174 A | 5/1977 | Fierro | 4,937,554 A | 6/1990 | Herman |
| 4,026,177 A | 5/1977 | Lokey | 4,965,909 A | 10/1990 | McCullough et al. |
| 4,029,159 A | 6/1977 | Nymann | 4,975,798 A * | 12/1990 | Edwards et al. ............... 361/56 |
| 4,047,156 A | 9/1977 | Atkins | 5,020,406 A | 6/1991 | Sasaki et al. |
| 4,048,886 A | 9/1977 | Zettler | 5,025,175 A | 6/1991 | Dubois, III |
| 4,060,160 A | 11/1977 | Lieber | 5,046,426 A | 9/1991 | Julien et al. |
| 4,070,940 A | 1/1978 | McDaniel et al. | 5,052,255 A | 10/1991 | Gaines |
| 4,075,961 A | 2/1978 | Harris | 5,074,047 A | 12/1991 | King |
| 4,077,161 A | 3/1978 | Wyle et al. | 5,081,406 A | 1/1992 | Hughes et al. |
| 4,085,303 A | 4/1978 | McIntyre et al. | 5,082,316 A | 1/1992 | Wardlaw |
| 4,090,345 A | 5/1978 | Harkness | 5,083,973 A | 1/1992 | Townsend |
| 4,091,698 A | 5/1978 | Obear et al. | 5,086,890 A | 2/1992 | Turczyn et al. |
| 4,106,378 A | 8/1978 | Kaiser | 5,094,000 A | 3/1992 | Becht et al. |

| | | | | | | |
|---|---|---|---|---|---|---|
| 5,119,555 A * | 6/1992 | Johnson ................ 29/254 | | 6,052,884 A | 4/2000 | Steckler et al. |
| 5,122,091 A | 6/1992 | Townsend | | 6,095,092 A | 8/2000 | Chou |
| 5,174,349 A | 12/1992 | Svetlik et al. | | 6,119,984 A | 9/2000 | Devine |
| 5,184,534 A | 2/1993 | Lee | | 6,133,818 A | 10/2000 | Hsieh et al. |
| 5,198,702 A | 3/1993 | McCullough et al. | | 6,141,192 A * | 10/2000 | Garzon ................ 361/5 |
| 5,199,343 A | 4/1993 | OBanion | | 6,148,504 A | 11/2000 | Schmidt et al. |
| 5,201,684 A | 4/1993 | DeBois, III | | 6,150,826 A | 11/2000 | Hokodate et al. |
| 5,207,253 A | 5/1993 | Hoshino et al. | | 6,170,370 B1 | 1/2001 | Sommerville |
| 5,212,621 A | 5/1993 | Panter | | 6,244,149 B1 | 6/2001 | Ceroll et al. |
| 5,218,189 A | 6/1993 | Hutchison | | 6,257,061 B1 | 7/2001 | Nonoyama et al. |
| 5,231,359 A | 7/1993 | Masuda et al. | | 6,352,137 B1 | 3/2002 | Stegall et al. |
| 5,231,906 A | 8/1993 | Kogej | | 6,366,099 B1 | 4/2002 | Reddi |
| 5,239,978 A | 8/1993 | Plangetis | | 6,376,939 B1 | 4/2002 | Suzuki et al. |
| 5,245,879 A | 9/1993 | McKeon | | 6,404,098 B1 | 6/2002 | Kayama et al. |
| 5,257,570 A | 11/1993 | Shiotani et al. | | 6,405,624 B1 | 6/2002 | Sutton |
| 5,265,510 A | 11/1993 | Hoyer-Ellefsen | | 6,418,829 B1 | 7/2002 | Pilchowski |
| 5,272,946 A | 12/1993 | McCullough et al. | | 6,420,814 B1 | 7/2002 | Bobbio |
| 5,276,431 A | 1/1994 | Piccoli et al. | | 6,427,570 B1 | 8/2002 | Miller et al. |
| 5,285,708 A | 2/1994 | Bosten et al. | | 6,430,007 B1 | 8/2002 | Jabbari |
| 5,320,382 A * | 6/1994 | Goldstein et al. ........... 280/735 | | 6,431,425 B1 | 8/2002 | Moorman et al. |
| 5,321,230 A * | 6/1994 | Shanklin et al. ........... 219/492 | | 6,450,077 B1 | 9/2002 | Ceroll et al. |
| 5,331,875 A | 7/1994 | Mayfield | | 6,453,786 B1 | 9/2002 | Ceroll et al. |
| 5,353,670 A | 10/1994 | Metzger, Jr. | | 6,460,442 B1 | 10/2002 | Talesky et al. |
| 5,377,554 A | 1/1995 | Reulein et al. | | 6,471,106 B1 | 10/2002 | Reining |
| 5,377,571 A | 1/1995 | Josephs | | 6,479,958 B1 | 11/2002 | Thompson et al. |
| 5,392,678 A | 2/1995 | Sasaki et al. | | D466,913 S | 12/2002 | Ceroll et al. |
| 5,401,928 A | 3/1995 | Kelley | | 6,492,802 B1 | 12/2002 | Bielski |
| 5,411,221 A | 5/1995 | Collins et al. | | D469,354 S | 1/2003 | Curtsinger |
| 5,451,750 A | 9/1995 | An | | 6,502,493 B1 | 1/2003 | Eccardt et al. |
| 5,453,903 A | 9/1995 | Chow | | 6,536,536 B1 | 3/2003 | Gass et al. |
| 5,471,888 A * | 12/1995 | McCormick ................ 74/2 | | 6,543,324 B1 | 4/2003 | Dils |
| 5,480,009 A | 1/1996 | Wieland et al. | | 6,546,835 B1 | 4/2003 | Wang |
| 5,503,059 A | 4/1996 | Pacholok | | 6,575,067 B1 | 6/2003 | Parks et al. |
| 5,510,685 A | 4/1996 | Grasselli | | 6,578,460 B1 | 6/2003 | Sartori |
| 5,513,548 A | 5/1996 | Garuglieri | | 6,578,856 B1 | 6/2003 | Kahle |
| 5,534,836 A | 7/1996 | Schenkel et al. | | 6,595,096 B1 | 7/2003 | Ceroll et al. |
| 5,572,916 A | 11/1996 | Takano | | D478,917 S | 8/2003 | Ceroll et al. |
| 5,587,618 A | 12/1996 | Hathaway | | 6,601,493 B1 | 8/2003 | Crofutt |
| 5,592,353 A * | 1/1997 | Shinohara et al. ........... 361/63 | | 6,607,015 B1 | 8/2003 | Chen |
| 5,606,889 A | 3/1997 | Bielinski et al. | | D479,538 S | 9/2003 | Welsh et al. |
| 5,623,860 A | 4/1997 | Schoene et al. | | 6,617,720 B1 | 9/2003 | Egan, III et al. |
| 5,648,644 A | 7/1997 | Nagel | | 6,619,348 B1 | 9/2003 | Wang |
| 5,659,454 A * | 8/1997 | Vermesse ................ 361/104 | | 6,640,683 B1 | 11/2003 | Lee |
| 5,667,152 A | 9/1997 | Mooring | | 6,644,157 B1 | 11/2003 | Huang |
| 5,671,633 A | 9/1997 | Wagner | | 6,647,847 B1 | 11/2003 | Hewitt et al. |
| 5,695,306 A | 12/1997 | Nygren, Jr. | | 6,659,233 B1 | 12/2003 | DeVlieg |
| 5,700,165 A * | 12/1997 | Harris et al. ................ 439/621 | | 6,736,042 B1 | 5/2004 | Behne et al. |
| 5,724,875 A | 3/1998 | Meredith et al. | | 6,742,430 B1 | 6/2004 | Chen |
| 5,730,165 A | 3/1998 | Philipp | | 6,826,988 B1 | 12/2004 | Gass et al. |
| 5,741,048 A | 4/1998 | Eccleston | | 6,857,345 B1 | 2/2005 | Gass et al. |
| 5,755,148 A | 5/1998 | Stumpf et al. | | 6,874,397 B1 | 4/2005 | Chang |
| 5,771,742 A | 6/1998 | Bokaie et al. | | 6,874,399 B1 | 4/2005 | Lee |
| 5,782,001 A | 7/1998 | Gray | | 7,000,514 B1 * | 2/2006 | Gass et al. ................ 83/58 |
| 5,787,779 A | 8/1998 | Garuglieri | | 2001/0032534 A1 | 10/2001 | Cerroll et al. |
| 5,791,057 A | 8/1998 | Nakamura et al. | | 2002/0096030 A1 | 7/2002 | Wang |
| 5,791,223 A | 8/1998 | Lanzer | | 2002/0109036 A1 | 8/2002 | Denen et al. |
| 5,791,224 A | 8/1998 | Suzuki et al. | | 2003/0005588 A1 | 1/2003 | Gass et al. |
| 5,791,441 A | 8/1998 | Matos et al. | | 2003/0019341 A1 | 1/2003 | Gass et al. |
| 5,819,619 A | 10/1998 | Miller et al. | | 2003/0020336 A1 | 1/2003 | Gass et al. |
| 5,852,951 A | 12/1998 | Santi | | 2003/0037651 A1 | 2/2003 | Gass et al. |
| 5,861,809 A | 1/1999 | Eckstein et al. | | 2003/0037655 A1 | 2/2003 | Chin-Chin |
| 5,875,698 A | 3/1999 | Ceroll et al. | | 2003/0056853 A1 | 3/2003 | Gass et al. |
| 5,921,367 A | 7/1999 | Kashioka et al. | | 2003/0074873 A1 | 4/2003 | Freiberg et al. |
| 5,930,096 A * | 7/1999 | Kim ................ 358/1.15 | | 2003/0089212 A1 | 5/2003 | Parks et al. |
| 5,937,720 A | 8/1999 | Itzov | | 2003/0101857 A1 | 6/2003 | Chuang |
| 5,942,975 A | 8/1999 | Sorensen | | 2003/0109798 A1 | 6/2003 | Kermani |
| 5,943,932 A | 8/1999 | Sberveglieri | | 2004/0011177 A1 | 1/2004 | Huang |
| 5,950,514 A | 9/1999 | Benedict et al. | | 2004/0060404 A1 | 4/2004 | Metzger, Jr. |
| 5,963,173 A | 10/1999 | Lian et al. | | 2004/0104085 A1 | 6/2004 | Lang et al. |
| 5,974,927 A | 11/1999 | Tsune | | 2004/0159198 A1 | 8/2004 | Peot et al. |
| 5,989,116 A | 11/1999 | Johnson et al. | | 2004/0194594 A1 | 10/2004 | Dils et al. |
| 6,018,284 A | 1/2000 | Rival et al. | | 2004/0200329 A1 | 10/2004 | Sako |
| 6,037,729 A | 3/2000 | Woods et al. | | 2004/0226424 A1 * | 11/2004 | O'Banion et al. ............ 83/58 |

| | | |
|---|---|---|
| 2004/0226800 A1 | 11/2004 | Pierga et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |

FOREIGN PATENT DOCUMENTS

| | | |
|---|---|---|
| DE | 76186 | 8/1921 |
| DE | 2800403 | 7/1979 |
| DE | 4235161 A1 | 5/1993 |
| DE | 4326313 | 2/1995 |
| DE | 19609771 | 6/1998 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 A * | 10/1982 |

OTHER PUBLICATIONS

*You Should Have Invented It*, French television show video.

* cited by examiner

FIRING SUBSYSTEM FOR USE IN A FAST-ACTING SAFETY SYSTEM

CROSS-REFERENCE TO RELATED APPLICATIONS

This application claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

FIELD

The invention relates to safety systems and more particularly to firing subsystems used in high-speed safety systems on power equipment.

BACKGROUND

Safety systems are often employed with power equipment such as table saws, miter saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular do saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms to 1 s to stop the blade. Therefore, the system is too slow to stop the blade quickly enough to avoid serious injury.

None of these existing systems have operated with sufficient speed and/or reliability to prevent serious injury with many types of commonly used power tools.

DETAILED DESCRIPTION

Figure 1:
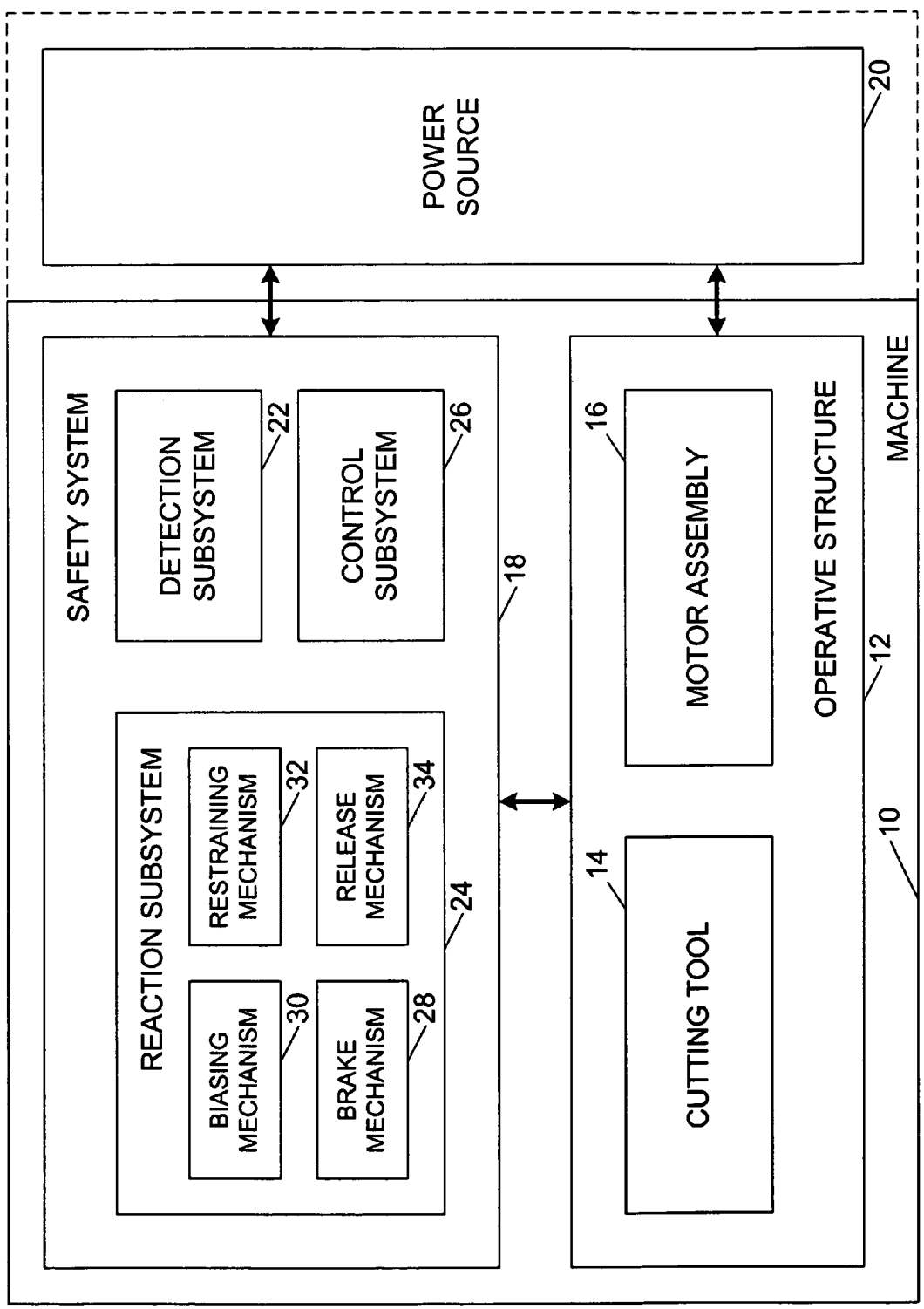
FIG. 1 is a schematic block diagram of a machine with a fast-acting safety system.

A machine that may incorporate a firing subsystem according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or So triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, entitled "Fast-Acting Safety Stop," filed Feb. 16, 2000 by SD3, LLC, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," also filed Aug. 14, 2000 by SD3, LLC., the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
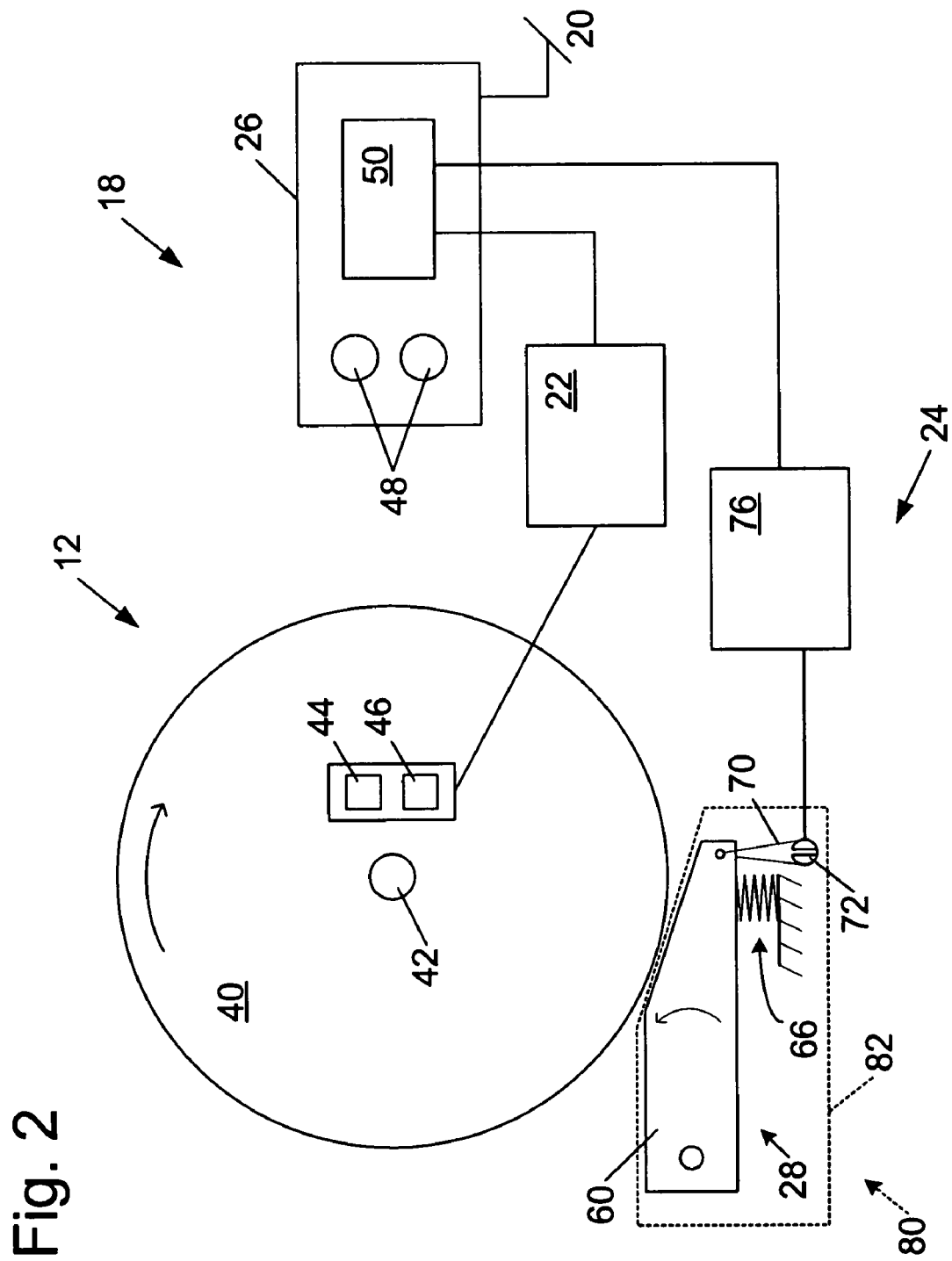
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

A restraining member, in the form of a fusible member 70, holds the pawl away from the edge of the blade. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/157,340, entitled "Fast-Acting Safety Stop," filed Oct. 1, 1999, and Ser. No. 60/182,866, also entitled "Fast-Acting Safety Stop," filed Feb. 16, 2000, the disclosures of which are herein incorporated by reference.

In many embodiments of safety system 18, a fusible member, such as member 70 shown in FIG. 2, will be used to restrain some element or action, such as to hold a brake or pawl away from a blade, as explained above. Such a fusible member may take different forms, but typically is a wire that will melt when a given amount of electrical current is passed through the wire, also as explained above. Once the wire melts, the brake or pawl is released to stop the blade.

When a pawl is used as a brake, the fusible member may be attached between the pawl and an anchor or mount, such as contact mount 72 shown in FIG. 2, to prevent the pawl from moving into the blade. In that embodiment, the pawl is biased by a spring toward the blade, so the pawl constantly pulls against the fusible member. Therefore, the fusible member should have a high tensile strength to bear the constant pull of the pawl and to prevent the fusible member from accidentally breaking. Additionally, the fusible member should have a high tensile strength so that the strength is maximized relative to the heat that is required to melt the member. Fusible members with high resistance are also preferred because of the more rapid heat build up for a given current. It will be appreciated that the size of the fusible member will depend, at least partially on the force required to restrain the spring. In general, greater spring forces are desirable to increase the speed and force with which the pawl contacts the blade. Where more pressure is required, a larger diameter fusible member may be needed, thereby requiring a larger amount of current to melt the fusible member. A greater amount of current, in turn, may require a firing system with more expensive electronic components. Thus, a safety system using a fusible member to release a brake or pawl must consider factors such as the amount of force applied to the fusible member and the size of the fusible member.

In the arrangement of a pawl and a fusible member shown in FIG. 2 and discussed above, spring 66 biases pawl 60 toward blade 40 with a specified force, and fusible member 70 is wire that has a tensile strength sufficient hold the pawl against the force of the spring. For example, the fusible member may be a 0.010-inch nichrome wire or a steel strand, and the spring may have a spring force of between approximately 5 and 25 pounds.

In FIG. 2, the fusible member is generally less than about 1 to 3 inches in length, and is wrapped around contact mount 72. Contact mount 72 is often generally circular in cross-section so that it does not present any edges that would concentrate stress to a specific section of the fusible member. Alternatively, a contact mount may include an edge to focus stress at a desired section of the fusible member. The contact mount may take many forms. It may be a stud or projection around which a fusible member is wrapped, it may be a screw with a radial hole through which the fusible member is threaded so that the screw can be turned to wrap the fusible member around the screw, it may be clamps, or it may be some other structure.

In FIG. 2, mount 72 includes a break region or gap of about 0.010 to 0.5-inch (or less) between halves of the mount. Current flows from one half of the mount, through the fusible member, to the other half of the mount and then to ground. The short break region is beneficial to focus the power to a small region to help melt the fusible member. The two halves of the mount may be thought of as two closely spaced electrodes, where the electrodes also serve as mounts for the fusible member. When electrodes also act as mounts, they must be strong enough to support the load of the fusible member.

Mounts to anchor the fusible member, alternatively, can be separate from the electrodes, and the electrodes may simply contact the fusible member. For example, in FIG. 2, contact mount 72 may be an anchor, and electrodes may be positioned against fusible member 70 between mount 72 and pawl 60.

It will be appreciated that the fusible member can be arranged in many alternative ways within the scope of the invention. As one example, one loop of wire can be attached to a contact stud and the opposite loop attached to a grounded stud. If the middle of the wire is placed over the end of the spring adjacent the pawl, the spring will be released when the wire is melted. In this arrangement, the current to melt the fusible member travels only from the contact stud, through the fusible member and into the grounded stud.

Figure 3:
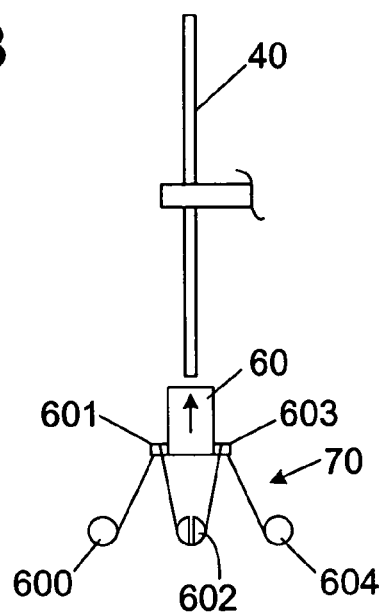
FIG. 3 shows a possible configuration of a fusible member.

In other embodiments, a wire with a relatively low tensile strength may be used to hold a pawl against a large spring force by looping the wire so that different portions of the wire work together to hold the pawl. For example, a wire may be looped in the configuration of the letter "M" or "W", as shown in FIG. 3. In this arrangement, fusible member 70 is fastened at one end to anchor 600. From there the fusible member wraps around a first post 601 on one side of pawl 60, then around mount 602, then around a second post 603 on the opposite side of the pawl, after which the fusible member is fastened to second anchor 604. In this manner, the sections of the fusible member between anchor 600 and post 601, between post 601 and mount 602, between mount 602 and post 603, and between post 603 and anchor 604 act like four separate strands that together hold the pawl away from the blade. Thus, a fusible member with tensile load strength of 30 pounds may hold a pawl biased toward the blade with a force of up to 120 pounds. In FIG. 3, mount 602 is configured to pass a surge of electrical current through a portion of the fusible member to melt the member. The fusible member then breaks apart at mount 602 and releases the pawl. This embodiment allows for the use of a fusible member with a relatively small diameter that may be melted with less current.

In some embodiments a fusible member will be used to hold a two-stage linkage, trap or compound release. The linkage or compound release, in turn, would restrain some action or hold some element such as a pawl. By holding the linkage or compound release, the fusible member effectively restrains an action or holds an element. Using a linkage or a compound release provides a mechanical advantage that allows the system to use a fusible member with a smaller diameter and lesser tensile strength to hold forces up to hundreds of pounds or more. This may allow use of a smaller fusible wire that can be melted more quickly and/or with a smaller current surge. Various linkages and compound releases are described in more detail in U.S. Provisional Patent Application Ser. No. 60/225,170, titled "Spring-Biased Brake Mechanism for Power Equipment," filed Aug. 14, 2000 by SD3, LLC, the disclosure of which is herein incorporated by reference.

Figure 4:
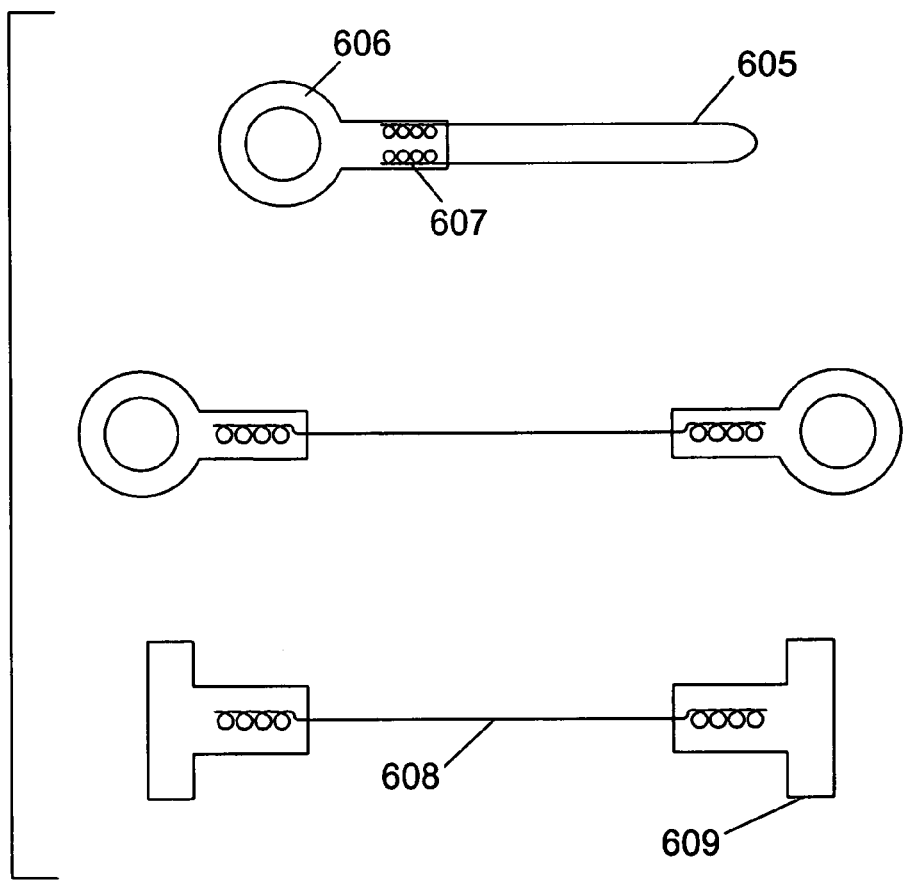
FIG. 4 shows various embodiments of fusible members.

The fusible member also may be formed from a wire overmolded with end caps or crimp blocks to establish a given length. Overmolding the ends of a wire with caps or crimp blocks provides an effective way to grip and hold the wire. FIG. 4 shows three such fusible members. First, a wire 605 is doubled back, and both ends of the wire are secured in loop 606. Loop 606 is a molded plastic element, and wire 605 is crimped or kinked at its ends 607 to keep the wire from breaking free of the loop. Loop 606 would typically be molded or pressed over the ends of the wire. Wire 605 may extend around electrodes, and loop 606 may extend over a pin on a pawl or a pin in a compound release.

The second fusible member shown in FIG. 4 is similar to the one just described, except that it has two loops, one at each end of the wire. As mentioned, the ends of the wire are crimped or kinked to secure the wire to the loops and to prevent the wire from being pulled away from loops.

Another wire 608 is also shown in FIG. 4, having caps 609 molded over the ends of the wire. The caps may be used to secure the wire in some embodiments.

Fusible members like those shown in FIG. 4 would be advantageous in a system employing cartridge 82 because the cartridge could simply be reloaded with a new fusible member after firing, and the fusible member would fit in the cartridge because it is of a given length and construction.

Of course, it will be understood by one of skill in the art that fusible members may be configured in numerous ways to hold a pawl or brake, and that the specific embodiments described simply illustrate possible ways. The fusible members themselves also may take different forms, such as a wire or a foil sheet. In some embodiments, it may be desirable to form the fusible member from a larger wire, sheet or strip with a reduced waist section of small size/width to achieve a higher current density at the waist section for more focused heating.

As explained above, the fusible member is connected to a firing system 76 that produces a sudden current surge to melt the fusible member in response to an output signal from the contact detection system. For the exemplary fusible member described above in connection with FIG. 2, approximately 20–100 Amps are required to ensure complete and rapid melting. As will be appreciated by those of skill in the art, there are many circuits suitable for supplying this current surge.

Figure 5:
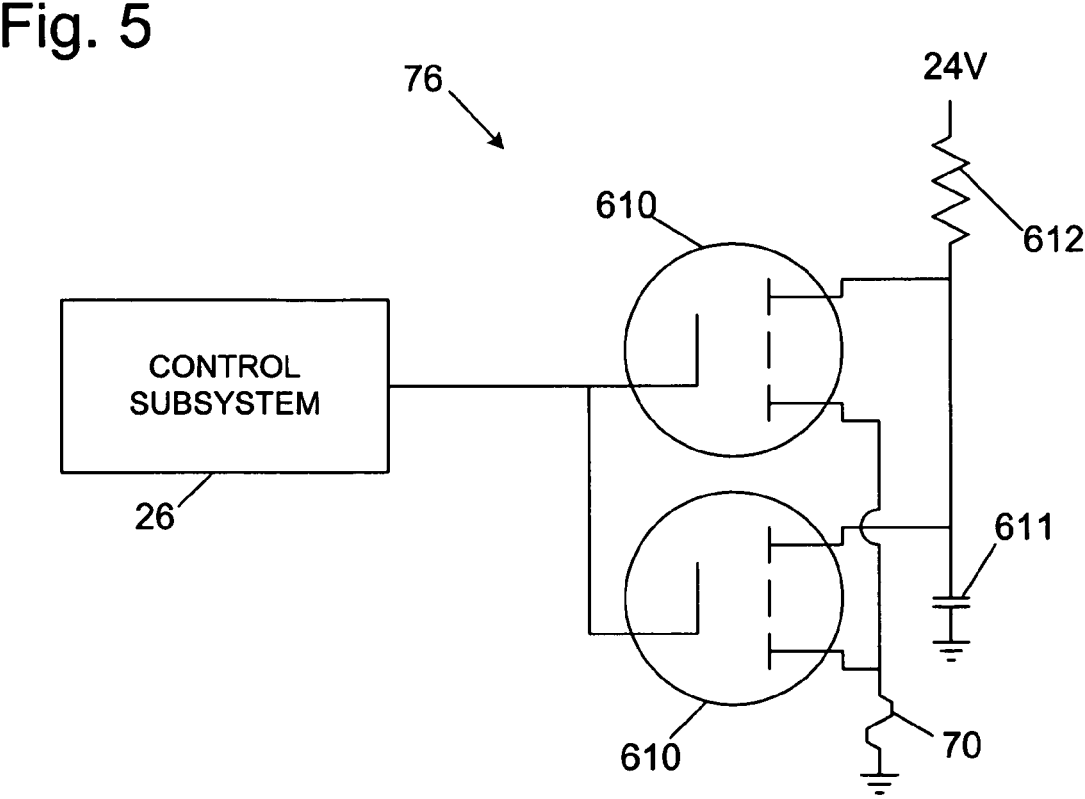
FIG. 5 shows an embodiment of a firing subsystem used with a machine having a fast-acting safety system.

One embodiment of firing system 76 is illustrated in FIG. 5. That exemplary embodiment includes one or more charge storage devices that are discharged through the fusible member in response to an output signal from the control subsystem. (The output signal from the control subsystem is dependant on detection of contact between the user and a blade, as explained above.) The use of charge storage devices obviates the need for a large current supply to melt the fusible member. It will be appreciated, however, that a current supply may be used instead of charge storage devices. Alternatively, other devices may be used to supply the necessary current, including a silicon-controlled rectifier or triac connected to a power supply line.

The firing system shown in FIG. 5 includes a pair of relatively high-current transistors 610 coupled to pass the current stored in the storage devices to fusible member 70. Transistors 610 are switched on by the output signal from control subsystem 26. As illustrated in FIG. 5, the output signal from control subsystem 26 is connected to the gates of transistors 610. Any suitable transistors may be used, such as IRFZ40 MOSFET transistors, which are well known in the art. The transistors are connected in parallel between charge storage devices 611 and fusible member 70. In the exemplary embodiment, charge storage devices 611 are in the form of a 75,000 μF capacitor bank. A 100-ohm resistor 612 connected to a 24-volt supply voltage establishes and maintains the charge on the capacitor bank. When the output of control subsystem 26 goes high, transistors 610 allow the charge stored in the capacitor bank to pass through the fusible member. The sudden release of the charge stored in the capacitor bank heats the fusible member to its melting point in approximately 1 to 5 ms. Alternatively, one or more of the transistors may be replaced by other switching devices such as SCR's. One advantage of using stored charge to fuse the fusible member is that the firing system does not rely on the capacity of line power or the phase of the line voltage.

Figure 6:
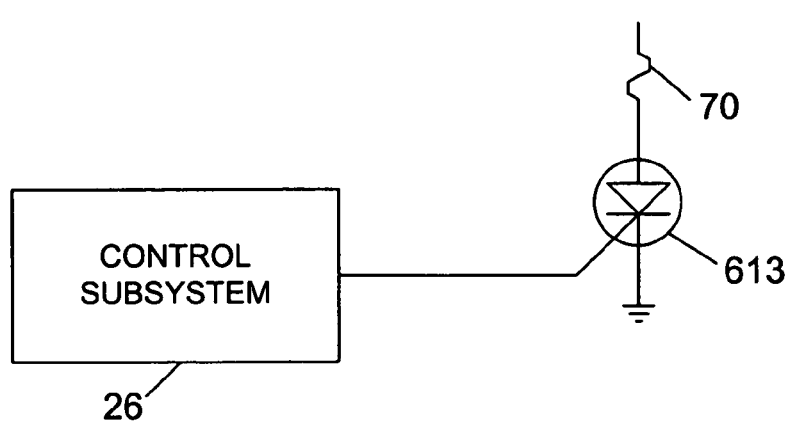
FIG. 6 shows another embodiment of a firing subsystem.

FIG. 6 shows an alternative embodiment of firing system 76. The alternative firing circuit includes fusible member 70 connected between a high voltage supply HV and an SCR 613, such as an NTE 5552 SCR. The gate terminal of the SCR is connected to control subsystem 26. Control subsystem 26 turns on SCR 613 by supplying approximately 40 mA of current, thereby allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is removed. The fact that the SCR stays on once triggered allows it to respond to even a short pulse from control system 26. It should be noted that a high voltage (HV) capacitor might supply the high voltage pulse. Use of a HV capacitor leads to a much higher current surge, and therefore a faster melting of the fusible member than is the case with a low voltage system. It will be appreciated that the size of the HV capacitor may be varied as required to supply the necessary current to melt fusible member 70.

Figure 7:
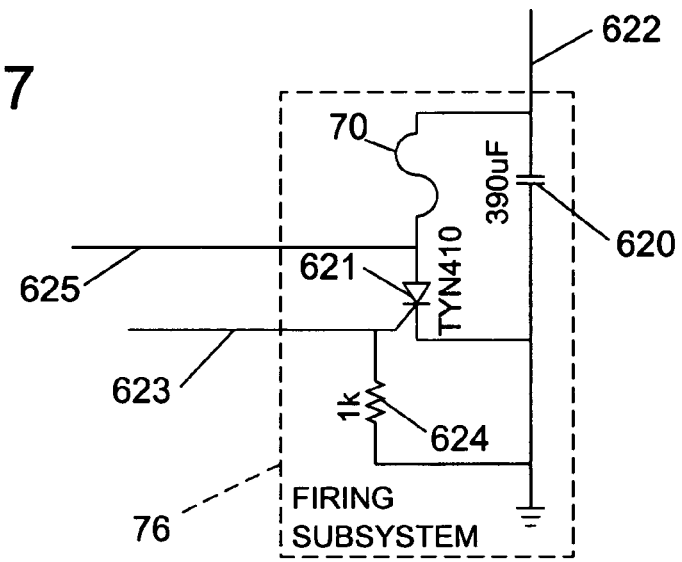
FIG. 7 shows still another embodiment of a firing subsystem.

FIG. 7 shows yet another embodiment of firing system 76. This embodiment includes a fusible member 70 connected between a 390 μF capacitor, identified by reference number 620, and a TYN410 SCR, identified by reference number 621. In embodiments like the one shown in FIG. 7, the capacitor 620 may range in value from approximately 100 μF to 5000 μF. Capacitor 620 is connected between a high voltage charging line 622 (from a buck-boost charger, for example), which charges the capacitor to approximately 180–200 volts, and ground. The gate terminal of the SCR is connected to the control subsystem at 623. A signal from the control subsystem at 623 turns on SCR 621, allowing the capacitor to discharge to ground through fusible member 70. In this embodiment, the capacitor is believed to provide a pulse of approximately 1000 to 1500 amps. As explained above, once the SCR is switched on, it will continue to conduct as long as the current through fusible member 70 remains above the holding current, so the SCR will conduct current through the fusible member until the fusible member is melted or the high voltage source is removed. Firing system 76 also includes a 1 k resistor 624 connected between the gate of the SCR and ground to hold the signal at 623 to ground until a signal from the control subsystem draws it up so that the firing system is not triggered by noise. A sense line 625 is connected between SCR 621 and fusible member 70 so that the control system can monitor the charge on capacitor 620 to insure that the capacitor is charged and functioning. Connecting sense line 625 downstream from fusible member 70 relative to capacitor 620 allows the control system to check the capacitor through the fusible member, which means that the control system also checks that fusible member 70 is intact and functioning. It should be noted that the sense line could also be used to charge the capacitor.

It will be appreciated by those of skill in the electrical arts that the exemplary embodiments of the firing system discussed above are just several of many configurations that may be used. Thus, it will be understood that any suitable embodiment or configuration could be used within the scope of the invention. The control systems, power supplies, sense lines and other items related to or used with firing systems are discussed in more detail in U.S. Provisional Patent Application Ser. No. 60/225,200, titled "Contact Detection System for Power Equipment," U.S. Provisional Patent Application Ser. No. 60/225,211, titled "Apparatus and Method for Detecting Dangerous Conditions in Power Equipment," and U.S. Provisional Patent Application Ser. No. 60/225,059, titled "Logic Control for Fast-Acting Safety System," all filed Aug. 14, 2000, the disclosures of which are herein incorporated by reference.

Figure 8:
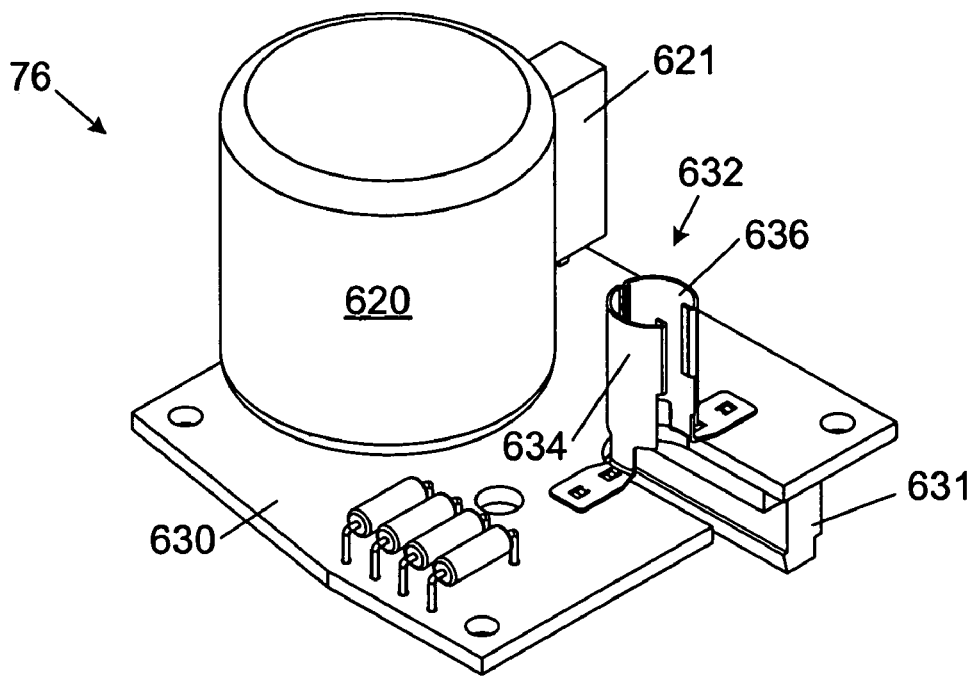
FIG. 8 shows a firing subsystem mounted on a printed circuit board.

FIG. 8 shows a firing system 76 assembled on a printed circuit board 630. The firing system is similar to the circuit shown in FIG. 7, and includes capacitor 620 and SCR 621. A socket 631 is associated with the printed circuit board so that the circuit can be connected to the control system, sensor line and power supply. A contact mount 632, made from spaced apart electrodes 634 and 636, is mounted on the printed circuit board. A fusible member extends around the contact mount in use.

Figure 9:
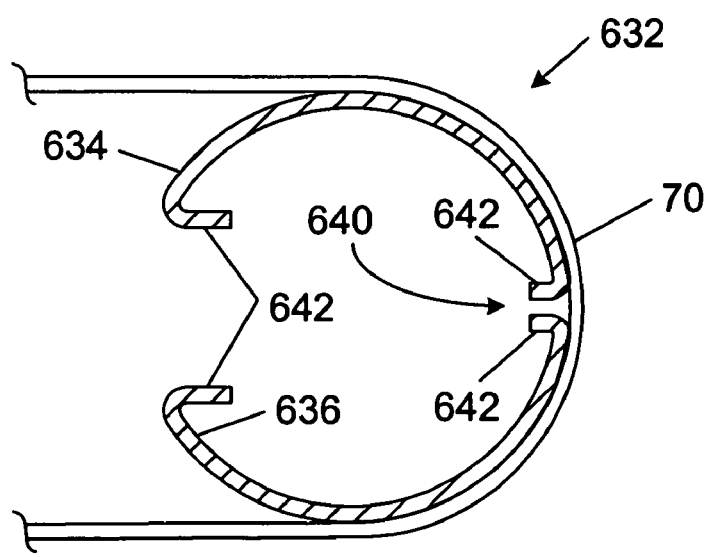
FIG. 9 shows a sectional view of electrodes used in a firing subsystem.

A top, sectional view of contact mount 632 and electrodes 634 and 636 is shown in FIG. 9, and fusible member 70 is wrapped over the electrodes. The electrodes are constructed with a small gap 640, as described above, and it is at that gap that the fusible member breaks or burns when current passes from one electrode to the other through the fusible member. Contact mount 632 is configured to fit over a supporting plug, and flanges 642 help hold the mount on the plug.

Figure 10:
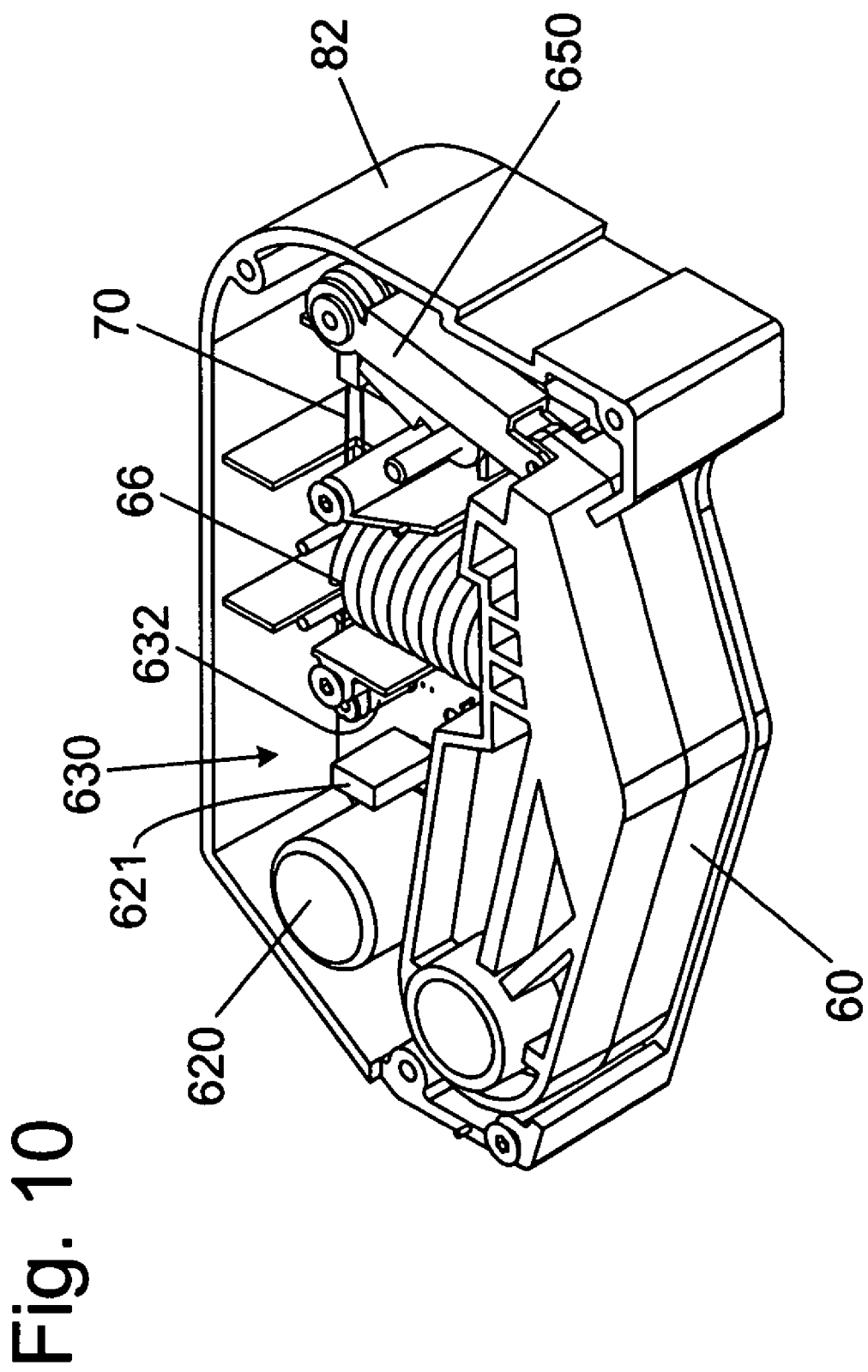
FIG. 10 shows a firing subsystem in a cartridge used with a machine having a fast-acting safety system.
Figure 12:
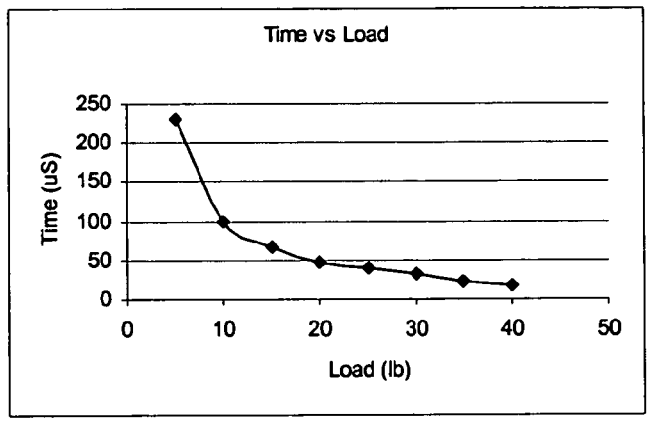
FIG. 12 shows a graph of data concerning the time to burn a wire under various conditions.

FIG. 10 shows printed circuit board 630, including capacitor 620 and SCR 621, mounted in cartridge 82. The cartridge houses pawl 60, spring 66, and fusible member 70. Fusible member 70 restrains pawl 60 from moving outwardly by restraining the motion of compound linkage 650. Fusible member 70 extends around contact mount 632. Contact mount 632 fits over a supporting plug that is part of the cartridge housing. Fusible member 70 bums when firing system 76 on printed circuit board 630 sends a surge of current through the fusible member. Compound linkage 650 and pawl 60 are then free to move, and spring 66 quickly forces pawl 60 outwardly. Cartridge 82 can be configured to fit into various types of power equipment, such as table saws, jointers, etc. Additionally, cartridge 82 can be "reloaded," or replenished with a new pawl and fusible member, and reused after the firing system has fired.

Figure 11:
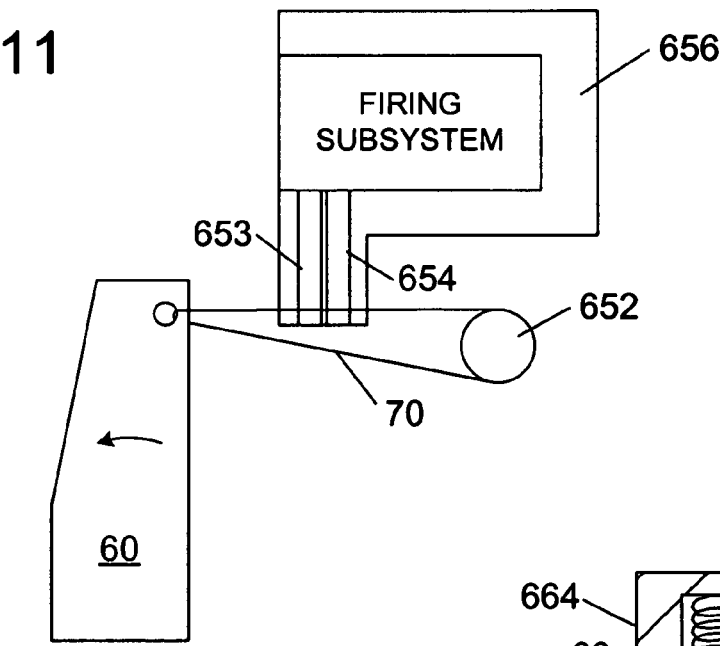
FIG. 11 shows two electrodes contacting a fusible member.

FIG. 11 shows an embodiment in which a fusible member 70 is mounted between an anchor 652 and a pawl 60. Two electrodes 653 and 654 contact the fusible member between the anchor and pawl, but do not support the fusible member. Electrodes 653 and 654 may take the form of conductive traces on a printed circuit board 656. The conductive traces are formed on the surface of the printed circuit board and extend slightly above that surface, so that fusible member 70 can contact them by extending across them. The printed circuit board can be positioned so that electrodes 653 and 654 apply some pressure against fusible member 70 to insure contact with the fusible member. Electrodes 653 and 654 are connected to a firing subsystem, as described. Of course, the configuration and orientation of electrodes 653 and 654 can vary.

FIGS. 12 through 15 show data concerning the time it takes for a firing subsystem to burn a wire given varying factors, such as the firing system, the wire size, the load on the fusible member, etc. FIG. 11 shows the approximate time it takes to burn a wire as the load on the wire varies. The wire tested was stainless steel, ASTM 302/304, spring tempered, with a diameter of 0.010 inches and was wrapped over brass electrodes with a 0.044 inch gap. The firing system used a 390 µF capacitor charged to 163 volts to burn the wire. The wire burned in approximately the following times for the specified loads: 231 µs with a 5 pound load, 98 µs with a 10 pound load, 68 µs with a 15 pound load, 48 µs with a 20 pound load, 39 µs with a 25 pound load, 33 µs with a 30 pound load, 22 µs with a 35 pound load, and 18 µs with a 40 pound load. This data show that the time to burn a fusible member decreases as the load on the member increases.

Figure 13:
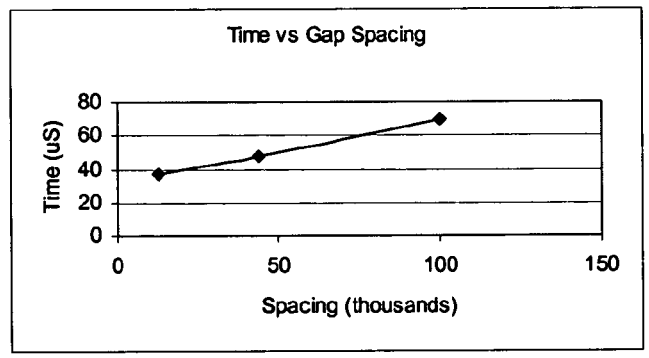
FIG. 13 also shows a graph of data concerning the time to burn a wire under various conditions.

FIG. 13 shows the approximate time it takes to burn a wire as the spacing between electrodes varies. The wire tested was stainless steel, ASTM 302/304, spring tempered, with a diameter of 0.010-inches and was wrapped over brass electrodes. The firing system used a 390 µF capacitor charged to 163 volts to burn the wire. The wire had a load of 20 pounds. The wire burned in approximately the following times for the specified gaps: 70 µs with a 0.1 inch gap, 47 µs with a 0.044 inch gap, and 37 µs with a 0.013 inch gap. This data shows that the time to burn a fusible member decreases as the gap between electrodes decreases.

Figure 14:
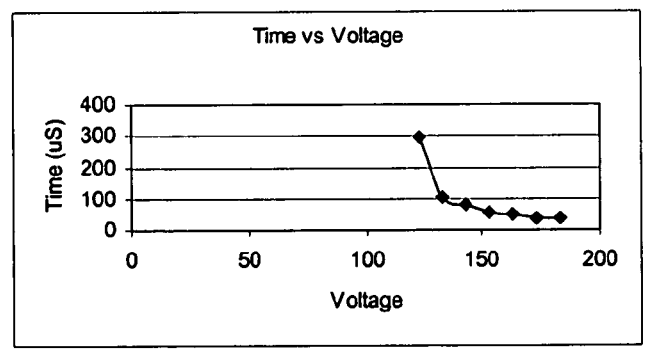
FIG. 14 also shows a graph of data concerning the time to burn a wire under various conditions.

FIG. 14 shows the approximate time it takes to burn a wire as the voltage on the capacitor in the firing system varies. The wire tested was stainless steel, ASTM 302/304, spring tempered, with a diameter of 0.010 inches and was wrapped over brass electrodes with a 0.044 inch gap. The firing system used a 390 µF capacitor. The wire burned in approximately the following times for the specified voltages: 296 µs with 123 volts, 103 µs with 133 volts, 81 µs with 143 volts, 57 µs with 153 volts, 47 µs with 163 volts, 40 µs with 173 volts, and 39 µs with 183 volts. The wire did not burn with voltages of only 103 µs or 113 volts. This data show that the time to burn a fusible member decreases as the voltage increases.

Figure 15:
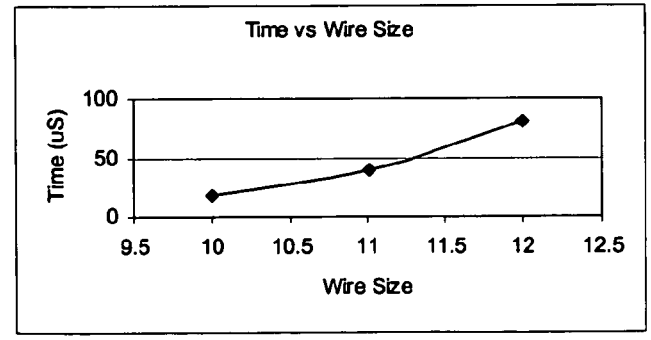
FIG. 15 also shows a graph of data concerning the time to burn a wire under various conditions.

FIG. 15 shows the approximate time it takes to burn wires of varying sizes. The wires tested were all stainless steel, ASTM 302/304, spring tempered, wires. The wires were wrapped over brass electrodes with a 0.044 inch gap. The firing system used a 390 µF capacitor with 163 volts. The wire had a load of 40 pounds. The wire burned in approximately the following times for the specified diameter sizes: 18 µs with a 0.010 inch diameter, 39 µs with a 0.011 inch diameter, and 81 µs with a 0.012 inch diameter. A wire with a 0.013 inch diameter did not burn. This data show that the time to burn a wire decreases as the diameter of the wire decreases.

This data shows that a system as described above can apply a load of 25 to 200 pounds to move a pawl toward a blade in less than 200 µs, and preferably in less than 50 µs. Stainless steel is a good material for fusible members because it has high resistance, high strength and good corrosion resistance.

Figure 16:
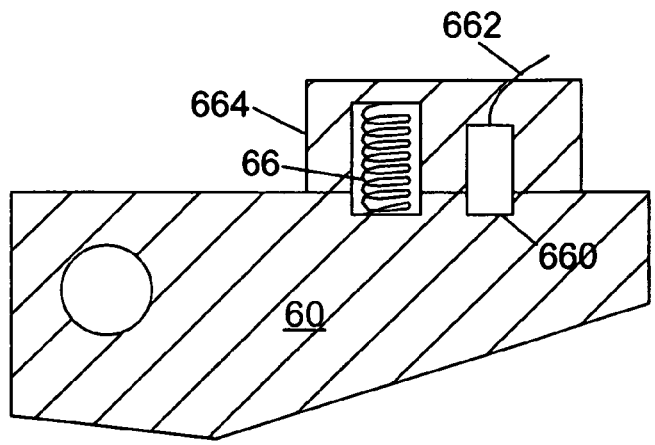
FIG. 16 shows an explosive charge that can be triggered by a firing subsystem.

Firing system 76 may also be used to trigger some action other than burning a fusible member. For example, firing system 76 can fire a small explosive charge to move a pawl. FIG. 16 shows a relatively small, self-contained explosive charge 660 in the form of a squib or detonator that can be used to drive pawl 60 against a blade. An example of a suitable explosive charge is an M-100 detonator available, for example, from Stresau Laboratory, Inc., of Spooner, Wis. The self-contained charge or squib focuses the force of the explosion along the direction of movement of the pawl. A trigger line 662 extends from the charge, at it may be connected to firing system 76 to trigger detonation.

Explosive charge 660 can be used to move pawl 60 by inserting the charge between the pawl and a stationary block 664 adjacent the charge. When the charge detonates, the pawl is pushed away from the block. A compression spring 66 is placed between the block and pawl to ensure the pawl does not bounce back from the blade when the charge is detonated. Prior to detonation, the pawl is held away from the blade by the friction-fit of the charge in both the block and pawl. However, the force created upon detonation of the charge is more than sufficient to overcome the friction fit. Alternatively, the pawl may be held away from the blade by other mechanisms such as a frangible member, gravity, a spring between the pawl and block, etc.

Firing system 76 may also trigger a DC solenoid, which can be over-driven with a current surge to create a rapid displacement, a pressurized air or gas cylinder to supply the pressure in place of the spring or charge, or an electromagnet to either repel the pawl against the blade or to release a spring-loaded pawl toward the blade.

INDUSTRIAL APPLICABILITY

The present invention is applicable to power equipment, and specifically to firing subsystems used in power equipment to trigger or release some action. The invention is particularly applicable to woodworking equipment such as table saws, miter saws, band saws, circular saws, jointers, etc. The firing subsystems described above provide effective systems to rapidly trigger or release an action upon the occurrence and detection of a predetermined event. The systems can be used to restrain some element or action until the occurrence and detection of the predetermined event. The systems are manufacturable, and can be implemented with standard components.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

The invention claimed is:

1. A cutting machine comprising:
   a blade configured to cut a workpiece;
   a detection system configured to detect a dangerous condition between a person and the blade;
   a reaction system adapted to perform a specified action to mitigate possible injury from the dangerous condition; and
   a fusible member adapted to fuse to trigger the reaction system to perform the specified action upon detection of the dangerous condition.

2. A cutting machine comprising:
   a support structure;
   a cutting tool adapted to cut a workpiece, where the cutting tool is supported by the support structure;
   a detection system adapted to detect a dangerous condition between the cutting tool and a person;
   a reaction system adapted to perform a specified action upon detection of the dangerous condition;
   a fusible member to trigger the reaction system to perform the specified action upon fusing of the fusible member; and
   a firing subsystem to fuse the fusible member upon detection of the dangerous condition.

3. The machine of claim 2, where the dangerous condition is contact between the person and the blade.

4. The machine of claim 2, where the reaction system is a brake mechanism and where the specified action is to decelerate the blade.

5. The machine of claim 2, where the fusible member is wire.

6. The machine of claim 5, where the wire has a diameter of less than 0.025 inch.

7. The machine of claim 5, where the wire has a diameter of less than 0.015 inch.

8. The machine of claim 2, where the fusible member is held in tension.

9. The machine of claim 2, where the firing subsystem includes at least two spaced-apart electrodes adapted to conduct electrical current, and where at least a portion of the fusible member is positioned to contact and extend between the electrodes.

10. The machine of claim 9, where the spacing between the electrodes is less than 1.0 inch (25.4 millimeters).

11. The machine of claim 9, where the spacing between the electrodes is less than 0.1 inch (2.54 millimeters).

12. The machine of claim 9, where the spacing between the electrodes is less than 0.05 inch (1.27 millimeters).

13. The machine of claim 9, where the electrodes are traces on a circuit board.

14. The machine of claim 2, where the firing subsystem includes at least one capacitor.

15. The machine of claim 2, where the firing subsystem includes at least one silicon controlled rectifier.

16. A cutting machine comprising:
    a cutting tool;
    a detection system adapted to detect contact between a person and the cutting tool; and
    a brake system including a brake pawl adapted to engage and stop the cutting tool when the detection system detects contact between the person and the cutter;
    where the brake system includes a release mechanism adapted to selectively restrain the brake pawl from engaging the cutter until the detection system detects contact between the person and the cutter; and
    where the release mechanism includes a fuse wire that is melted upon detection of contact between the person and the cutter.

17. A cutting machine comprising:
    a cutter;
    a brake adapted to stop the cutter, where the brake has an idle position and a breaking position;
    an actuation system adapted to selectively move the brake from the idle position to the braking position, where at least a portion of the actuation system must be replaced after moving the brake from the idle position to the braking position; and
    wherein the at least a portion of the actuation system is a fusible member that is melted to allow the brake to move from the idle position to the braking position.

18. A cutting machine comprising:
    a support structure;
    cutting means for cutting a workpiece, where the cutting means is supported by the support structure;
    detection means for detecting a dangerous condition between the cutting means and a person;
    reaction means for performing a specified action upon detection of the dangerous condition;
    fusible means for triggering the reaction means to perform the specified action upon fusing of the fusible means; and
    firing means for fusing the fusible member upon detection of the dangerous condition.

* * * * *